US012552300B2

(12) United States Patent
Liu (10) Patent No.: US 12,552,300 B2
(45) Date of Patent: Feb. 17, 2026

(54) SAFETY BELT CLAMPING DEVICE AND CHILD SEAT FOR VEHICLE (71) Applicant: WONDERLAND SWITZERLAND AG, Steinhausen (CH)

(72) Inventor: Weihuan Liu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 189 days.

(21) Appl. No.: 18/261,566

(22) PCT Filed: Jan. 14, 2022

(86) PCT No.: PCT/EP2022/050775
§ 371 (c)(1),
(2) Date: Jul. 14, 2023

(87) PCT Pub. No.: WO2022/152868
PCT Pub. Date: Jul. 21, 2022

(65) Prior Publication Data
US 2024/0083309 A1    Mar. 14, 2024

(30) Foreign Application Priority Data
Jan. 15, 2021   (CN) .......................... 202120118334.4

(51) Int. Cl.
B60N 2/26    (2006.01)
B60N 2/28    (2006.01)

(52) U.S. Cl.
CPC ............ B60N 2/265 (2013.01); B60N 2/2806 (2013.01)

(58) Field of Classification Search
CPC .............................. B60N 2/265; B60N 2/2806
See application file for complete search history.

(56) References Cited

U.S. PATENT DOCUMENTS 10,035,436 B2    7/2018   Zhou et al.
10,189,381 B2 *  1/2019   Williams ............... B60N 2/265
(Continued)

FOREIGN PATENT DOCUMENTS

CN    202847479 U    4/2013
CN    103770672 A    5/2014
(Continued)

OTHER PUBLICATIONS

Japanese Application No. 2023-542977; Notification of reasons for refusal dated May 7, 2024 with English translation; 22 pages.
(Continued)

Primary Examiner — Milton Nelson, Jr.
(74) Attorney, Agent, or Firm — CANTOR COLBURN LLP (57) ABSTRACT Disclosed is a safety belt clamping device, including a clamping member having a connection portion at a side of the clamping member. The safety belt clamping device further includes a locking mechanism mounted at another side of the clamping member. The locking mechanism includes a driving member, a locking member, and an elastic member. The locking member is movably provided at a side of the clamping member, has a locking position and an unlocking position. The elastic member is installed at the side of the clamping member, and configured to keep the locking member constantly have a tendency to move from an unlocking position to a locking position. The driving member is movably provided at the side of the clamping member. The driving member is configured to drive the locking member to be switched between the locking position and the unlocking position. The present application further discloses a child seat for a vehicle.

20 Claims, 6 Drawing Sheets

(56) References Cited

U.S. PATENT DOCUMENTS

| | | | |
|---|---|---|---|
| 10,696,192 B2 | 6/2020 | Harmes, V et al. | |
| 2014/0084649 A1 | 3/2014 | Guo | |
| 2016/0347210 A1* | 12/2016 | Mason | B60N 2/2821 |
| 2017/0190268 A1 | 7/2017 | Zhao | |
| 2018/0079330 A1 | 3/2018 | Williams et al. | |
| 2018/0345827 A1 | 12/2018 | Anderson et al. | |
| 2018/0370392 A1 | 12/2018 | Harmes, V et al. | |

FOREIGN PATENT DOCUMENTS

| | | |
|---|---|---|
| CN | 105015376 B | 8/2017 |
| CN | 104527469 B | 2/2018 |
| CN | 108973797 A | 12/2018 |
| CN | 109130975 A | 1/2019 |
| EP | 0452804 A2 | 10/1991 |
| JP | 2019006386 A | 1/2019 |
| TW | M483329 U | 8/2014 |

OTHER PUBLICATIONS

Taiwanese Application No. 112136713; Office Action dated Apr. 8, 2024 with English translation; 39 pages.
Australian Application No. 2022207666; Examination report No. 1 dated Jul. 29, 2024; 4 pages.
Taiwanese Application No. 111101669; First Office Action w English translation dated Oct. 5, 2022; 8 pages.
International Search Report for International Application No. PCT/EP2022/050775; International Filing Date: Jan. 14, 2022; Date of Mailing: May 10, 2022; 3 pages.
Taiwanese Application No. 11110166; First Office Action w english translation dated Oct. 7, 2022; 8 pages.
Written Opinion for International Application No. PCT/EP2022/050775; International Filing Date: Jan. 14, 2022; Date of Mailing: May 10, 2022; 5 pages.

\* cited by examiner

SAFETY BELT CLAMPING DEVICE AND CHILD SEAT FOR VEHICLE

CROSS-REFERENCES TO RELATED APPLICATIONS

This application is a U.S. National Stage of International Application No PCT/EP2022/050775, filed on Jan. 14, 2022, which claims a priority of Chinese Patent Application No. 202120118334.4, filed on Jan. 15, 2021, with the title of "SAFETY BELT CLAMPING DEVICE AND CHILD SEAT FOR VEHICLE", the entire content of which are incorporated herein by reference.

TECHNICAL FIELD

The present application relates to the field of child appliances, in particular to a safety belt clamping device and a child seat for vehicle.

BACKGROUND

Related vehicle seats are always equipped with devices of safety belts, and the safety belts may be configured to protect adult passengers and may also be configured to fix child safety seats to protect babies and young children on board.

For the child safety seat, the safety seat is usually mounted on a vehicle seat by means of a clamping device clamping a safety belt in the vehicle through. When the clamping device is released, the safety belt is freely movable to facilitate binding or unlocking the safety belt. When the clamping device is locked, the safety belt is fastened to the child safety seat, thereby realizing a connection between the child safety seat and the vehicle seat. An existing clamping device includes an unlocking button and a locking hook, and the unlocking button and the locking hook are fixed, while the child safety seat is provided with a locking pin corresponding to the locking hook. By operating the unlocking button, the locking hook engages with or disengages from the locking pin, such that the clamping device is in a locking state or a releasing state. Although the mode of driving the locking hook by the unlocking button to lock and unlock is simple to operate and convenient to unlock, it makes it easy for a child to wrongly unlock due to an accidental touch, which would seriously threaten onboard safety of the child during the use of the child safety seat.

Accordingly, there is an urgent need for a safety belt clamping device to address the above problem.

SUMMARY

One object of the present application is to provide a safety belt clamping device which may prevent misuses and has high safety.

The other object of the present application is to provide a child seat for vehicle with high safety.

In order to achieve the above objects, the present application provides a safety belt clamping device including a clamping member having a connection portion at a side of the clamping member. The safety belt clamping device further includes a locking mechanism mounted at another side of the clamping member. The locking mechanism includes a driving member, a locking member, and an elastic member. The locking member is movably provided at a side of the clamping member, and has a locking position and an unlocking position. The elastic member is installed at the side of the clamping member, and configured to keep the locking member constantly having a tendency to move from the unlocking position to the locking position. The driving member is movably provided at the side of the clamping member, and the driving member is configured to drive the locking member to be switched between the locking position and the unlocking position.

In some embodiments according to the present application, the safety belt clamping device further includes an operating member connected to the driving member, and the driving member is configured to move under an operating of the operating member to drive the locking member to switch between the locking position and the unlocking position.

In some embodiments according to the present application, the driving member is pivotally connected to the clamping member, and the locking member is pivotally connected to the clamping member.

In some embodiments according to the present application, the driving member extends towards the locking member to form an abutting portion, the locking member extends to form a push matching portion corresponding to the abutting portion, and the push matching portion is configured to rotate under pushing of the abutting portion.

In some embodiments according to the present application, the abutting portion is a hook, and the push matching portion is a protruding structure formed by the locking member extending towards an interior of the hook.

In some embodiments according to the present application, the abutting portion is separated from the push matching portion when the locking member is in the locking position, and the abutting portion is forced to get close to the push matching portion to push the push matching portion through the locking member rotating from the locking position to the unlocking position.

In some embodiments according to the present application, the locking member comprises a locking member body, and a locking hook formed by the locking member body extending outwards. The push matching portion is disposed at an outer side of the locking member body. The locking hook and the push matching portion are arranged to be spaced apart from each other.

In some embodiments according to the present application, the operating member is provided with a connection opening, the driving member extends towards the connection opening to form a connection lug, and the connection lug is inserted into and connected to the connection opening.

In some embodiments according to the present application, the operating member includes an operating member body extending outwards to form a pulling portion, and the connection opening is arranged at an inner side of the operating member body.

In some embodiments according to the present application, the pulling portion and the connection opening are disposed at two sides of the operating member, and the pulling portion has a plate-shaped structure.

In some embodiments according to the present application, a longitudinal sectional view of the operating member along a length direction of the clamping member has a similar T shape. One end of a top of the operating member is an operating member body, another end of the top of the operating member is a pulling portion, a middle and lower part of the operating member is a supporting portion, and the supporting portion is approximately perpendicular to the operating member body and the pulling portion. The connection opening is disposed between the operating member body and the supporting portion of the operating member.

In order to achieve the above objects, the present application provides a child seat for vehicle including the safety belt clamping device above.

In some embodiments according to the present application, the child seat for the vehicle further includes a seat body. The connection portion of the clamping member is pivotably connected to the seat body. A piece to be clamped is clamped or released through pivoting of the clamping member. The seat body is provided with a locking engaging part corresponding to the locking member. The locking member engages with the locking engaging part to lock pivoting of the clamping member relative to the seat body when the locking member is in the locking position.

In some embodiments according to the present application, the seat body is provided with a clamping groove corresponding to the clamping member. The locking engaging part is disposed in the clamping groove, and when the locking member engages with the locking engaging part, the clamping member is arranged in the clamping groove.

In some embodiments according to the present application, the safety belt clamping device is disposed on a seating part of the seat body.

Compared with related art, the safety belt clamping device of the present application provides a locking mechanism, the locking mechanism includes an operating member, a driving member, a locking member and an elastic member, the locking member is movably disposed at the side of the clamping member, has the locking position and the unlocking position, and is movably switched between the locking position and the unlocking position, accordingly, the clamping member realizes tightly clamping or unlocking the external piece to be clamped. The elastic member is mounted at the side of the clamping member and enables the locking member to constantly have a tendency to move from the unlocking position to the locking position, so that the locking member is kept at the locking position and the clamping member tightly clamps the piece to be clamped. The driving member is movably disposed at the side of the clamping member, the operating member is connected to the driving member, the driving member moves under the operation of the operating member to drive the locking member to switch between the locking position and the unlocking position, thus driving the locking member to overcome the elastic force of the elastic member and to switch from the locking position to the unlocking position, and enabling the clamping member to release the piece to be clamped to realize the unlocking. The driving member is provided between the operating member and the locking member, and the driving member functions as a driving structure and forms an extension, therefore it may avoid the risk that the unlocking is trigged by a slightly touch in the related art, which may effectively avoid an unlocking by mistake due to the child's accidental touch, thus ensuring the onboard safety of the child and achieving the high safety.

DETAILED DESCRIPTION OF THE EMBODIMENTS

In order to describe technical contents, structural features, the purposes and the effects to be achieved by the present application in detail, the embodiments will be illustrated in detail by referring to accompanying drawings herein.

Referring to FIGS. 1 to 4, the present application provides a child seat for vehicle 100 including a seat body 20, and a safety belt clamping device 10. The safety belt clamping device 10 is configured to clamp or release a piece to be clamped (not shown in the drawings). In the present embodiment, the piece to be clamped is a safety belt in a vehicle, and the piece to be clamped is configured to fix the seat body 20 of the child seat for vehicle 100 to the vehicle. The safety belt clamping device 10 is disposed on a seating part of the seat body 20. However, the present application is not limited to this, and for example, the safety belt clamping device may of course be disposed on a back part or any other position of the seat body 20. The safety belt clamping device 10 includes a clamping member 1 and a locking mechanism 2, a side of the clamping member 1 has a connection portion 11 pivotably connected to the seat body 20, and the piece to be clamped is tightly clamped or released through pivoting of the clamping member 1. For example, the clamping member 1 pivots around the connection portion 11 towards the seat body 20 in a direction indicated by an arrow A in FIG. 2 and to clamp the piece to be clamped between the clamping member 1 and the seat body 20, so that the seat body 20 is fixed to the vehicle. The clamping member 1 pivots around the connection portion 11 away from the seat body 20 in a direction opposite to the direction indicated by the arrow A in FIG. 2 and release the piece to be clamped (not shown), so as to remove the seat body 20 from the vehicle. The locking mechanism 2 is installed at another side of the clamping member 1, that is, the connection portion 11 and the locking mechanism 2 are arranged at two opposite sides of the clamping member 1. In the present embodiments, the clamping member 1 has a long bar shape, and the connection portion 11 and the locking mechanism 2 are arranged at two opposite ends of the clamping member 1. The locking mechanism 2 includes an operating member 21, a driving member 22, a locking member 23, and an elastic member (not shown). By referring to FIGS. 4 and 5, the locking member 23 is movably provided at a side of the clamping member 1, has a locking position shown in FIG. 4 and an unlocking position shown in FIG. 5, and is movably switched between the locking position and the unlocking position. Referring to FIGS. 2 to 5, the seat body 20 is provided with a locking engaging part 201 corresponding to the locking member 23, when in the locking position, the locking member 23 engages with the locking engaging part 201, thereby locking a pivot of the clamping member 1 relative to seat body 20, and tightly clamping the external piece to be clamped by the clamping member 1. when in the unlocking position, the locking member 23 is separated from the locking engaging part 201, thereby unlocking a pivot of the clamping member 1 relative to the seat body 20, so that the clamping member 1 releases the external piece to be clamped. The elastic member is installed at a side of the clamping member 1 and enables the locking member 23 to constantly have a tendency to move from the unlocking position to the locking position, so that the locking member 23 is kept in the locking member, and the clamping member 1 tightly clamps the piece to be clamped. In some embodiments, the elastic member is but not limited to a torsion spring. The driving member 22 is movably disposed at a side of the clamping member 1. Driven by the driving member 22, the locking member 23 is switched between the locking position and the unlocking position. The operating member 21 is connected to the driving member 22, and the driving member 22 moves under an operating of the operating member 21 to drive the locking member 23 to switch between the locking position and the unlocking position, so that the locking member 23 may switch from a locking position to an unlocking position by overcoming an elastic force of the elastic member, accordingly, the clamping member 1 releases the piece to be clamped to release a locking. As the driving member 22 is provided between the operating member 21 and the locking member 23, and the driving member 22 functions as a driving structure to form an extension, thereby preventing the risk in related art that an unlocking is trigged by a slight touch, effectively preventing a wrong unlocking by an accident touch of a child, and ensuring onboard safety of babies and the high safety. It should be noted that the driving member 22 may be integrated with the operating member 21 to form a unitary structure, and the driving member 22 and the operating member may be separated structures and are further assembled. The driving member 22 and the operating member 21 are two modules named according to the functions thereof, but should not be limited to this.

Referring to FIGS. 4-7, more specifically, the driving member 22 is pivotally connected to the clamping member 1, and the locking member 23 is pivotally connected to the clamping member 1. The driving member 22 rotates under the operation of the operating member 21 to drive the locking member 23 to rotatably switch between the locking position and the unlocking position. Since the operating member 21, the driving member 22 and the locking member 23 are all rotatable, so that a more smoothly interlocked movement is implemented among the operating member 21, the driving member 22 and the locking member 23. It should be noted that, in other embodiments, the driving member 22 may be slidably disposed to the clamping member 1, the locking member 23 may be slidably disposed at a side of the clamping member 1, and the locking member 23 is driven to move by movement of the driving member 22, thereby realizing switching of the locking member 23 between the locking position and the unlocking position. Specifically, the driving member 22 extends towards the locking member 23 to form an abutting portion 221, the locking member 23 extends to form a push matching portion 231 corresponding to the abutting portion 221. The push matching portion 231 rotates under pushing of the abutting portion 221. Preferably, the abutting portion 221 is a hook, and the push matching portion 231 is a protruding structure formed by the locking member 23 extending towards the interior of the hook. When the locking member 23 is in the locking position, the abutting portion 221 is separated from the push matching portion 231, that is, there is a distance between the abutting portion 221 and the push matching portion 231, and the abutting portion 221 gets close to the push matching portion 231 by means of the rotation of the driving member 22 and then pushes the push matching portion 231. Since the abutting portion 221 is separated from the push matching portion 231 when the locking member 23 is in the locking position, that is, there is a certain distance between the push matching portion 231 and the abutting portion 221, before the abutting member 221 is in contact with and abuts against the push matching portion 231, the driving member 22 is forced to move from the locking position for a certain distance, which may effectively avoid an unlocking by mistake due to a child's accidental touch, thereby ensuring the onboard safety of the baby and achieving the high safety. In other embodiments, the driving member 22 may be provided with a reset torsion spring. The reset torsion spring is configured to provide an elastic force forcing the abutting portion 221 of the driving member 22 to have a tendency to release abutting against the push matching portion 231 of the locking member 23. It should be noted that, the present application is not limited to the above embodiments, and for example, the manufacture may also select to have the reset torsion spring not provided. The locking member 23 engages with or disengages from the locking engaging part 201, thereby realizing a stable connection or a separation between the locking member 23 and the locking engaging part 201. Specifically, the locking member 23 includes a locking member body 232, and a locking hook 233 formed by the locking member body 232 extending outwards. The push matching portion 231 is disposed at an outer side of the locking member body 232, the locking hook 233 is arranged to be spaced apart from the push matching portion 231, and the locking hook 233 is disposed adjacent to the push matching portion 231. Please referring to FIG. 3, correspondingly, the locking engaging part 201 is a locking pin, and the locking hook 233 engages with or disengages from the locking pin, thereby realizing locking or unlocking. Of course, the present application is not limited to the above embodiments, and for example, the manufacture may adjust the above locking structure to be any other locking structure according to requirement.

Figure 4:
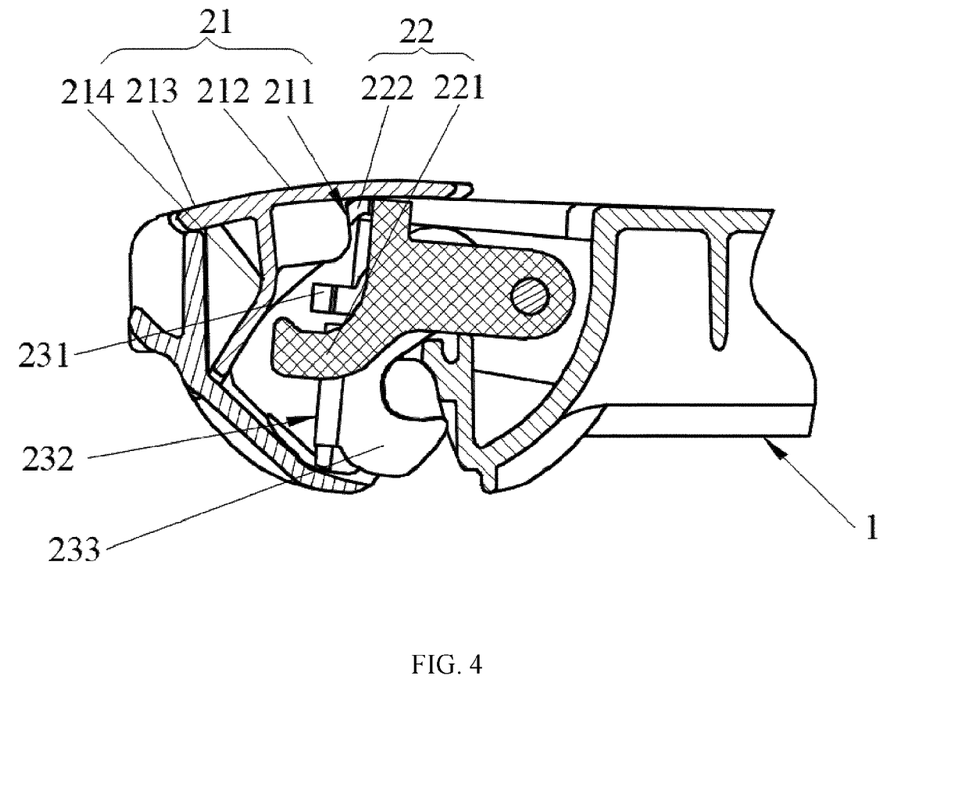
FIG. 4 is a state view showing the child seat for vehicle of FIG. 3 with a locking member in a locking position.
Figure 5:
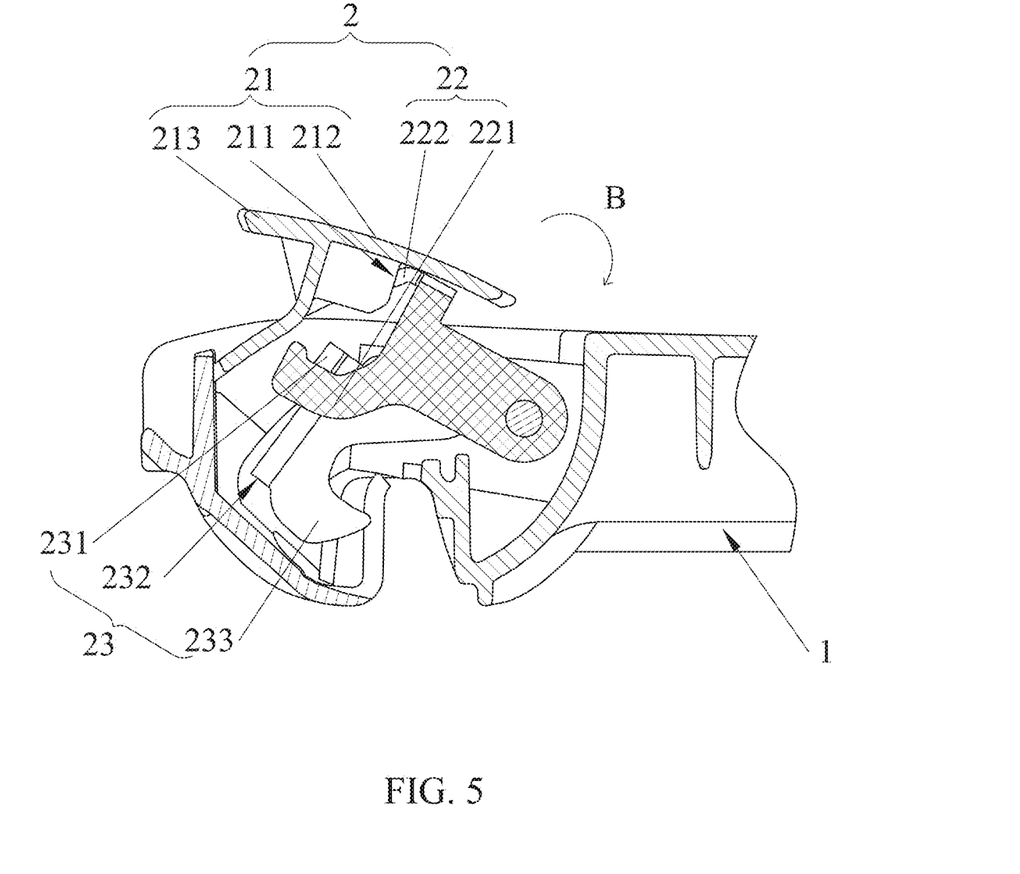
FIG. 5 is a state view showing the child seat for vehicle of FIG. 3 with the locking member in an unlocking position.
Figure 6:
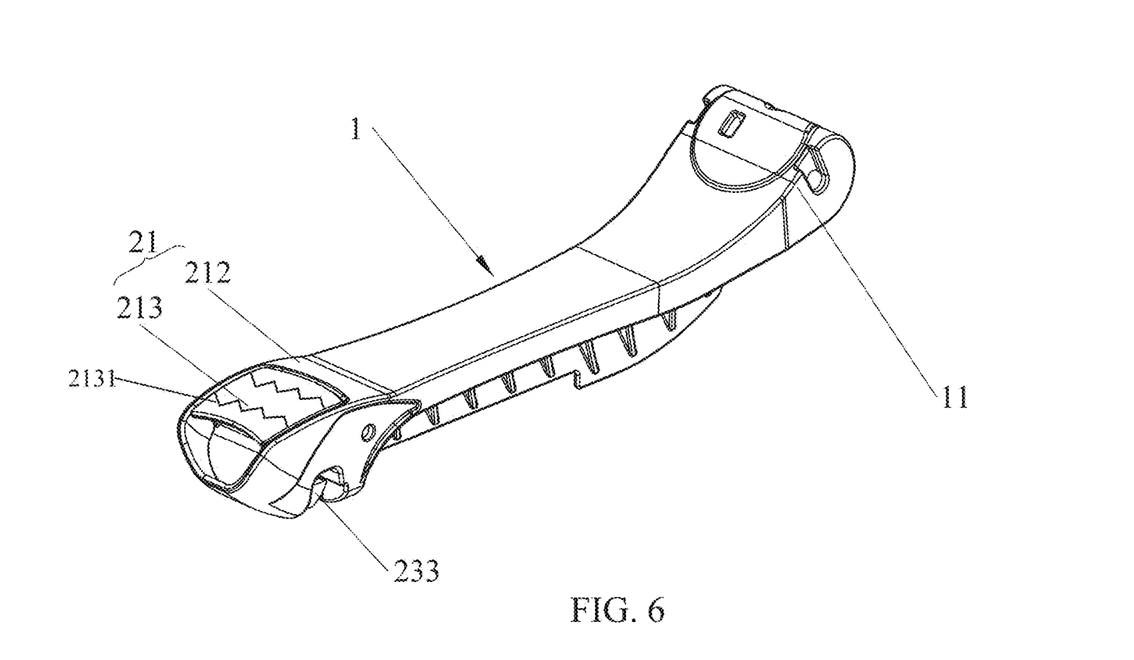
FIG. 6 is a schematic perspective view showing a structure of the safety belt clamping device according to the present application.
Figure 7:
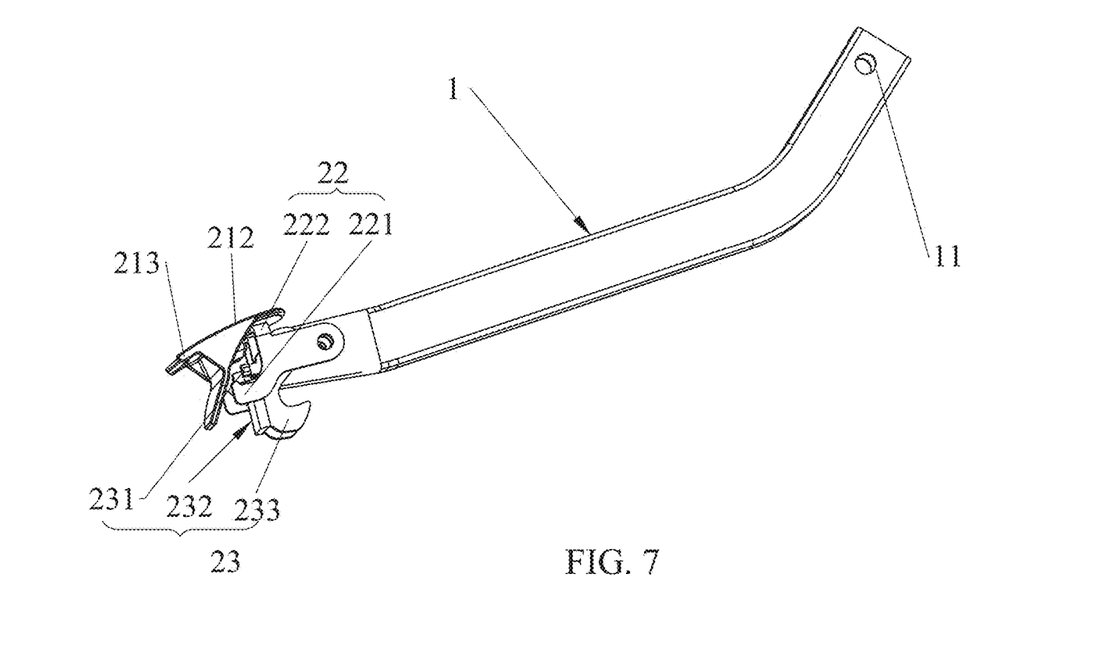
FIG. 7 is another schematic perspective view showing the structure of the safety belt clamping device according to the present application.

Please referring to FIGS. 4 to 5, the operating member 21 is provided with a connection opening 211, and the driving member 22 extends towards the connection opening 211 to form a connection lug 222. The connection lug 222 is inserted into and connected to the connection opening 211 to fix the operating member 21 to the driving member 22, and the operating member 21 may drive the driving member 22 to rotate, thereby improving stability of movement of the driving member 22. It is noted that, the present application is not limited to the above embodiments, and for example, the manufacture may choose other connection manners to realize a stable connection between the operating member 21 and the driving member 22. Specifically, the operating member 21 includes an operating member body 212, and the operating member body 212 extends outwards to form a pulling portion 213. The connection opening 211 is arranged at an inner side of the operating member body 212 of the operating member 21. The pulling portion 213 and the connection opening 211 are disposed at two sides of the operating member 21, the pulling portion 213 has a plate-shaped structure, and the pulling portion 213 is provided with anti-slipping texture 2131. However, the present application is not limited to the above embodiments.

In some embodiments of the present application, as shown in FIG. 4, a longitudinal sectional view of the operating member 21 along a length direction of the clamping member 1 has a similar T shape. One end of the top of the similar T-shaped operating member 21 is the operating member body 212, and another end is the pulling portion 213. The middle and lower part of the operating member 21 is a supporting portion 214. The supporting portion 214 is approximately perpendicular to the operating member body 212 and the pulling portion 213. The connection opening 211 is disposed between the operating member body 212 and the supporting portion 214 of the operating member 21.

Figure 1:
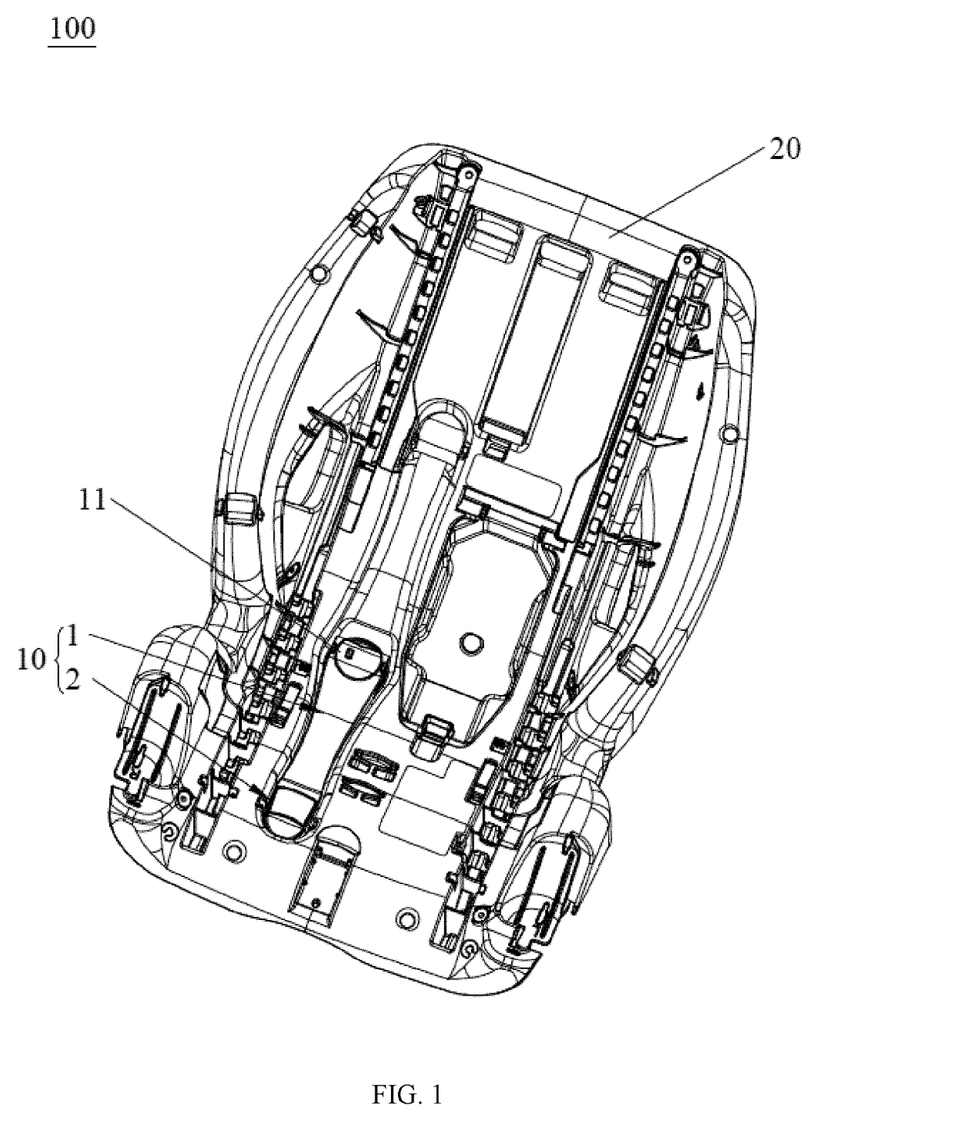
FIG. 1 is a perspective view showing a schematic structure of a child seat for vehicle when the safety belt clamping device is tightly clamping a piece to be clamped according to the present application.
Figure 2:
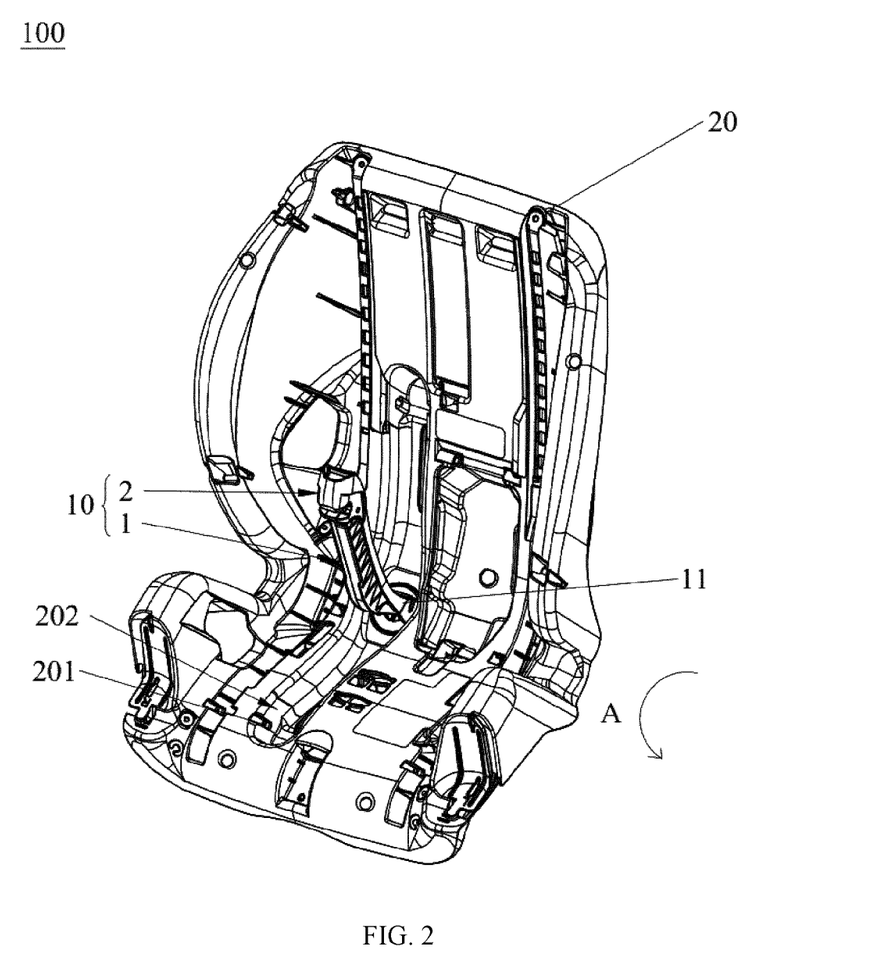
FIG. 2 is a perspective view showing a schematic structure of the child seat for vehicle when the safety belt clamping device releases the piece to be clamped according to the present application.
Figure 3:
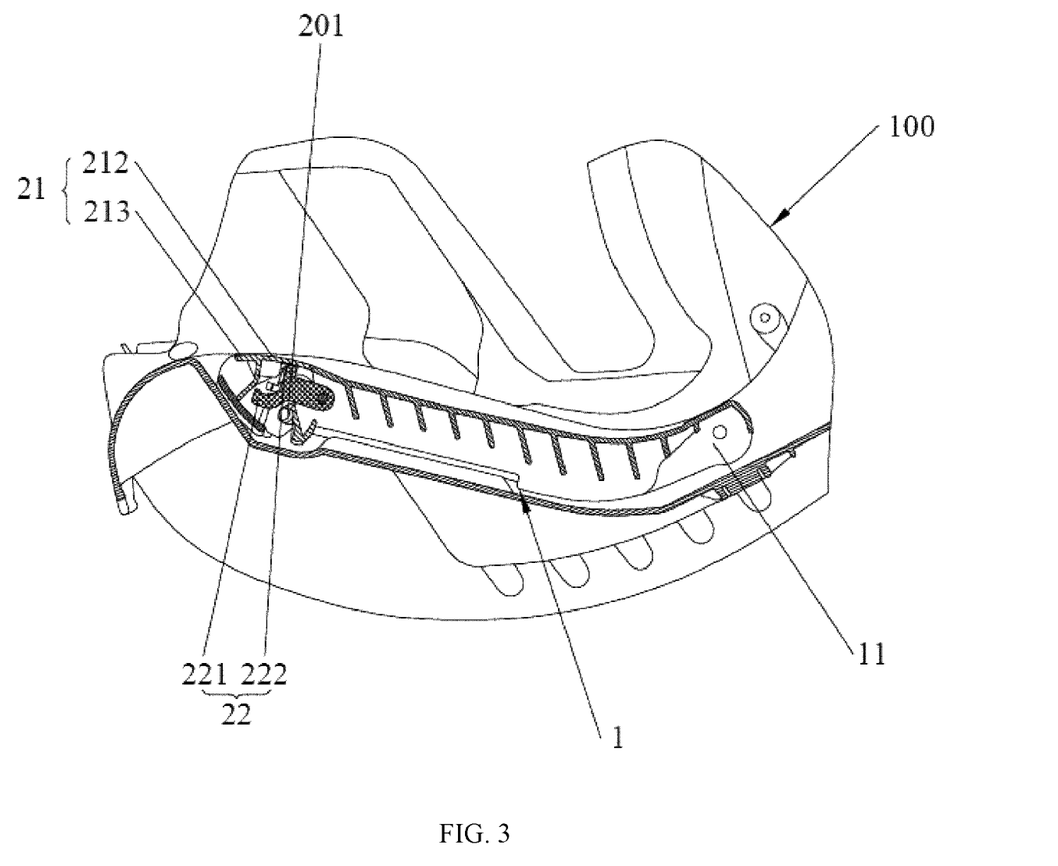
FIG. 3 is a schematic view showing a partial interior structure of the child seat for vehicle of FIG. 1.

Referring to FIGS. 1-2, the seat body 20 is provided with a clamping groove 202 corresponding to the clamping member 1, and the locking engaging part 201 is disposed in the clamping groove 202. When the locking member 23 engages with the locking engaging part 201, the clamping member 1 is disposed in the clamping groove 202. The arrangement of the clamping groove 202 may effectively prevent the clamping member 1 from protruding from the seat body 20, thereby effectively avoiding discomfort feeling of babies.

In combination with FIGS. 1-7, a mounting process of the child seat for vehicle 100 is described in detail as follows.

When it is desired to mount the seat body 20 to the vehicle, the operating member 21 is pulled, the driving member 22 rotates in a direction indicated by an arrow B in FIG. 5 under the operation of the operating member 21. Driven by a rotation of the driving member 22, the abutting portion 221 gets close to the push matching portion 231 and pushes the push matching portion 231. Under the push of the abutting portion 221, the locking member 23 rotates from the locking position to the unlocking position, and the locking member 23 disengages from the locking engaging part 201 by overcoming the elastic force of the elastic member. At this time, the clamping member 1 pivots on the connection portion 11 and rotates away from the seat body 20 in a pivoting direction opposite to the direction indicated by the arrow A in FIG. 2, the piece to be clamped is arranged between the clamping groove 202 and the clamping member 1. The clamping member 1 pivots on the connection portion 11 and rotates close to the seat body 20 in a pivoting direction indicated by the arrow A in FIG. 2, and the piece to be clamped is clamped between the clamping member 1 and the seat body 20. The locking member 23 rotates from the unlocking position to the locking position under the action of an elastic restoration of the elastic member, and the driving member 22 and the operating member 21 are reset, so that the piece to be clamped is tightly clamped and the seat body 20 is fixed to the vehicle. When it is desired to detach the seat body 20 from the vehicle, the above processes are repeated in a reverse sequence to take out the safety belt.

The locking mechanism 2 is provided, the locking mechanism 2 includes an operating member 21, a driving member 22, a locking member 23 and an elastic member, the locking member 23 is movably disposed at the side of the clamping member 1, has the locking position and the unlocking position, and is movably switched between the locking position and the unlocking position, accordingly, the clamping member 1 realizes tightly clamping or unlocking the external piece to be clamped. The elastic member is mounted at the side of the clamping member 1 and enables the locking member 23 to constantly have a tendency to move from the unlocking position to the locking position, so that the locking member 23 is kept at the locking position and the clamping member 1 tightly clamps the piece to be clamped. The driving member 22 is movably disposed at the side of the clamping member 1, the operating member 21 is connected to the driving member 22, the driving member 22 moves under the operation of the operating member 21 to drive the locking member 23 to switch between the locking position and the unlocking position, thus driving the locking member 23 to overcome the elastic force of the elastic member and to switch from the locking position to the unlocking position, and enabling the clamping member 1 to release the piece to be clamped to realize the unlocking. The driving member 22 is provided between the operating member 21 and the locking member 23, and the driving member 22 functions as a driving structure and forms an extension, therefore it may avoid the risk that the unlocking is trigged by a slightly touch in the related art, which may effectively avoid an unlocking by mistake due to the child's accidental touch, thus ensuring the onboard safety of the child and achieving the high safety.

Disclosed above are merely preferred embodiments of the present application, and should not be used for limiting the protection scope of the present application. Therefore, the equivalent changes made on the basis of the embodiments of the patent application fall within the scope covered by the present application.

What is claimed is:

1. A safety belt clamping device, comprising a clamping member having a connection portion at a side of the clamping member, wherein the safety belt clamping device further comprises a locking mechanism mounted at an other side of the clamping member; wherein:
    the locking mechanism comprises a driving member and a locking member;
    the locking member is movably provided at the other side of the clamping member, and has a locking position and an unlocking position;
    the driving member is movably provided at the other side of the clamping member; and
    the driving member is configured to drive the locking member to move from the locking position to the unlocking position;
    the locking member is pivotally connected to the clamping member and the driving member is pivotally connected to the clamping member;
    wherein the driving member extends towards the locking member to form an abutting portion, the locking member extends to form a push matching portion corresponding to the abutting portion, and the push matching portion is configured to rotate under pushing of the abutting portion.

2. The safety belt clamping device of claim 1, wherein the abutting portion is a hook, and the push matching portion is a protruding structure formed by the locking member extending towards an interior of the hook.

3. The safety belt clamping device of claim 1, wherein:
    the abutting portion is separated from the push matching portion when the locking member is in the locking position; and
    the abutting portion is forced to get close to the push matching portion to push the push matching portion through the locking member rotating from the locking position to the unlocking position.

4. The safety belt clamping device of claim 1, wherein:
    the locking member comprises a locking member body, and a locking hook formed by the locking member body extending outwards;
    the push matching portion is disposed at an outer side of the locking member body; and
    the locking hook and the push matching portion are arranged to be spaced apart from each other.

5. The safety belt clamping device of claim 4, wherein the locking hook is disposed adjacent to the push matching portion.

6. The safety belt clamping device of claim 1, wherein the abutting portion and the push matching portion are configured to be separated from each other when the locking member is in the locking position.

7. A child seat for a vehicle, comprising the safety belt clamping device of claim 1.

8. The child seat for the vehicle of claim 7, further comprising a seat body, wherein:
the connection portion of the clamping member is pivotably connected to the seat body;
a piece to be clamped is clamped or released through pivoting of the clamping member;
the seat body is provided with a locking engaging part corresponding to the locking member; and
the locking member engages with the locking engaging part to lock pivoting of the clamping member relative to the seat body when the locking member is in the locking position.

9. The child seat for the vehicle of claim 8, wherein:
the seat body is provided with a clamping groove corresponding to the clamping member;
the locking engaging part is disposed in the clamping groove; and
when the locking member engages with the locking engaging part, the clamping member is arranged in the clamping groove.

10. A child seat for a vehicle comprising:
a seat body having a locking engaging part; and
a safety belt clamping device, comprising:
a clamping member having a connection portion at a side of the clamping member, the connection portion of the clamping member being pivotably connected to the seat body, wherein a piece to be clamped is clamped or released through pivoting of the clamping member; and
a locking mechanism mounted at an other side of the clamping member, the locking mechanism comprising a driving member and a locking member;
wherein the locking member is movably provided at the other side of the clamping member, and has a locking position and an unlocking position, the locking member corresponds to the locking engaging part of the seat body;
the driving member is movably provided at the other side of the clamping member;
the driving member is configured to drive the locking member to move from the locking position to the unlocking position; and
the locking member engages with the locking engaging part to lock pivoting of the clamping member relative to the seat body when the locking member is in the locking position.

11. The child seat for the vehicle of claim 10, wherein:
the seat body is provided with a clamping groove corresponding to the clamping member;
the locking engaging part is disposed in the clamping groove; and
when the locking member engages with the locking engaging part, the clamping member is arranged in the clamping groove.

12. The child seat for the vehicle of claim 10, wherein the safety belt clamping device is disposed on a seating part of the seat body.

13. A safety belt clamping device, comprising:
a clamping member having a connection portion at a side of the clamping member; and
a locking mechanism mounted at an other side of the clamping member; wherein:
the locking mechanism comprises a driving member and a locking member;
the locking member is movably provided at the other side of the clamping member, and has a locking position and an unlocking position;
the driving member is movably provided at the other side of the clamping member;
the driving member is configured to drive the locking member to move from the locking position to the unlocking position;
the safety belt clamping device further comprises an operating member connected to the driving member, wherein the driving member is configured to move under an operating of the operating member to drive the locking member to switch between the locking position and the unlocking position;
the operating member is provided with a connection opening;
the driving member extends towards the connection opening to form a connection lug; and
the connection lug is inserted into and connected to the connection opening.

14. The safety belt clamping device of claim 13, wherein the operating member comprises an operating member body extending outwards to form a pulling portion, and the connection opening is arranged at an inner side of the operating member body.

15. The safety belt clamping device of claim 14, wherein:
the pulling portion and the connection opening are disposed at two sides of the operating member, and the pulling portion has a plate-shaped structure.

16. The safety belt clamping device of claim 14, wherein the pulling portion is provided with anti-slipping texture.

17. The safety belt clamping device of claim 13, wherein:
a longitudinal sectional view of the operating member along a length direction of the clamping member has a substantially T shape;
one end of a top of the operating member is an operating member body;
another end of the top of the operating member is a pulling portion;
a middle and lower part of the operating member is a supporting portion, and the supporting portion is approximately perpendicular to the operating member body and the pulling portion; and
the connection opening is disposed between the operating member body and the supporting portion of the operating member.

18. A child seat for a vehicle, comprising the safety belt clamping device of claim 13.

19. The child seat for the vehicle of claim 18, further comprising a seat body, wherein:
the connection portion of the clamping member is pivotably connected to the seat body;
a piece to be clamped is clamped or released through pivoting of the clamping member;
the seat body is provided with a locking engaging part corresponding to the locking member; and
the locking member engages with the locking engaging part to lock pivoting of the clamping member relative to the seat body when the locking member is in the locking position.

20. The child seat for the vehicle of claim 19, wherein the seat body is provided with a clamping groove corresponding to the clamping member;
the locking engaging part is disposed in the clamping groove; and when the locking member engages with the locking engaging part, the clamping member is arranged in the clamping groove.

\* \* \* \* \*